United States Patent
Wagmann et al.

(10) Patent No.: US 10,715,643 B2
(45) Date of Patent: Jul. 14, 2020

(54) SYSTEMS AND/OR METHODS FOR INTELLIGENT AND RESILIENT FAILOVER FOR CLOUD COMPUTING ENVIRONMENTS

(71) Applicant: Software AG, Darmstadt (DE)

(72) Inventors: Christoph Wagmann, Bexbach (DE); Marc Lehmann, Blieskastel (DE)

(73) Assignee: Software AG, Darmstadt (DE)

( * ) Notice: Subject to any disclaimer, the term of this patent is extended or adjusted under 35 U.S.C. 154(b) by 133 days.

(21) Appl. No.: 16/130,059

(22) Filed: Sep. 13, 2018

(65) Prior Publication Data

US 2020/0092404 A1 Mar. 19, 2020

(51) Int. Cl.
*H04L 29/14* (2006.01)
*G06F 11/20* (2006.01)
*G06F 11/14* (2006.01)
*H04L 29/08* (2006.01)

(52) U.S. Cl.
CPC .......... *H04L 69/40* (2013.01); *G06F 11/1482* (2013.01); *G06F 11/2023* (2013.01); *H04L 67/10* (2013.01)

(58) Field of Classification Search
CPC ............... G06F 11/1415; G06F 11/142; G06F 11/1425; G06F 11/1428; G06F 11/143; G06F 11/1474; G06F 11/1482; G06F 11/1484; G06F 11/2023; G06F 11/3006; G06F 11/301; G06F 11/302; H04L 41/0668; H04L 41/0672; H04L 41/0681; H04L 69/40
See application file for complete search history.

(56) References Cited

U.S. PATENT DOCUMENTS

| 9,465,698 B2 | 10/2016 | Wagmann | |
|---|---|---|---|
| 2011/0271136 A1* | 11/2011 | Abbot | G06F 11/2023 714/2 |
| 2013/0080823 A1* | 3/2013 | Roth | G06F 11/2023 714/4.1 |

(Continued)

OTHER PUBLICATIONS

Mohammed et al., "Failover strategy for fault tolerance in cloud computing environment", 2017, Wiley Online Library (Year: 2017).*

(Continued)

*Primary Examiner* — Gabriel Chu
(74) *Attorney, Agent, or Firm* — Nixon & Vanderhye PC (57) ABSTRACT

A cloud computing system includes computing nodes that execute a shared application and/or service accessible by client computing devices over a network. A resilience multiplexer is configured to: receive signals (e.g., from a cloud controller, registry service, error handler, and/or failover service) indicative of potential problems with components of the system and/or network; identify a rule to be executed to determine how to respond to the potential problem, based on attributes of the received signal including which component generated it and what information is included in/otherwise associated with it, and other network-related data; execute the identified rule to determine whether a failover is or might be needed; if a failover is needed, selectively trigger a failover sequence; and if a failover only might be needed, initiate a resilience mode. In resilience mode, information regarding the potential problem is communicated to other components, without immediately initiating a failover sequence.

25 Claims, 6 Drawing Sheets

(56) References Cited

U.S. PATENT DOCUMENTS

| | | | |
|---|---|---|---|
| 2015/0254142 A1 | 9/2015 | Wagmann | |
| 2016/0020969 A1* | 1/2016 | Vasseur | H04L 43/062 370/252 |
| 2019/0102260 A1* | 4/2019 | Yang | G06F 11/2023 |
| 2019/0149397 A1* | 5/2019 | Celozzi | G06F 9/45558 |

OTHER PUBLICATIONS

Venkateswar R. Yerravalli et al., "High Availability Cluster Failover Mechanism Using Artificial Neural Networks," 2015 IEEE International Conference on Cloud Computing in Emerging Markets (CCEM), Nov. 2015, pp. 81-84.

Anjali D. Meshram et al., "Fault Tolerance Model for Reliable Cloud Computing," International Journal on Recent and Innovation Trends in Computing and Communication, vol. 1, Issue 7, Jul. 2013, pp. 600-603.

Bashir Mohamed et al., "An Integrated Virtualized Strategy for Fault Tolerance in Cloud Computing Environment," 2016 Intl IEEE Conferences on Ubiquitous Intelligence & Computing, Advanced and Trusted Computing, Scalable Computing and Communications, Cloud and Big Data Computing, Internet of People, and Smart World Congress, Jul. 2016, pp. 542-549.

* cited by examiner

SYSTEMS AND/OR METHODS FOR INTELLIGENT AND RESILIENT FAILOVER FOR CLOUD COMPUTING ENVIRONMENTS

TECHNICAL FIELD

Certain example embodiments described herein relate to cloud computing technology. More particularly, certain example embodiments described herein relate to systems and/or methods for intelligent and resilient failover in cloud computing environments.

BACKGROUND AND SUMMARY

Cloud computing refers generally to an information technology paradigm that enables access to shared pools of configurable system resources and higher-level services that can be rapidly provisioned with little management effort, oftentimes using distributed computing systems and oftentimes over the Internet. Cloud computing generally relies on the sharing of resources to achieve coherence and the ability to scale, potentially dynamically, to address requests from requesting computing systems and the like.

Cloud computing has become more and more ubiquitous, especially as the microservice architectures have gained in popularity. Microservice architecture may be thought of as being a variant of the service-oriented architecture (SOA) architectural style, which structures an application as a collection of loosely-coupled services. In microservices architectures, services typically are fine-grained and the protocols typically are lightweight. Potential benefits of decomposing an application into different smaller services include the ability to improve modularity, and the ability to make applications easier to understand, develop, and test. Microservice-based architectures can enable continuous delivery and deployment so that applications can emerge over time, e.g., through independent and modular development.

Current failover systems are mostly implemented in hardware systems and/or third-party software. Although such systems and/or software approaches are of great benefit in a variety of scenarios, they generally do not work well with today's cloud computing infrastructures and microservice architectures, where failover mechanisms oftentimes need to be tailored to the demands of specific web applications, services, or the like. That is, current failover mechanisms generally have no knowledge of the data or use cases of the corresponding services. Yet module-based standalone services are much more applicable to modern usage in distributed computing environment. As a result, well-known failover mechanisms generally only look at the availability of specific services or application back-ends (e.g., databases, search engines, etc.) at a very abstract level.

One well-known type of failover mechanism involves a simple "aliveness" check, e.g., a ping, which determines whether a specific node of a cluster is reachable. A common strategy to provide for failover with this approach is the fail-fast strategy. This strategy directly triggers a failover mechanism as soon as a specific node is determined to be no longer reachable. In this approach, if there is downtime corresponding to even a few seconds or a few minutes, the overhead of switching to another service instance is accepted and incurred, which in some instances can even lead to longer downtimes or delays, e.g., where there are time-intensive startup procedures for complex services or replication instances, etc. Another common strategy is the on fail, try next available strategy. In contrast to the fail-fast strategy that simply triggers a failover as soon as a node is not reachable anymore, this strategy first tries the next best reachable node before triggering a failover. Yet another strategy is the on fail, try all strategy, which tries to reach all available nodes in a cluster. These latter two strategies, however, are not particularly well tailored to cloud computing environments and still depend on simple "aliveness" checks and thus operate at a very abstract level.

It will be appreciated that in providing a more sophisticated failover mechanism, it would be desirable to provide or collect appropriate information and send it to a service that is configured to process the provided information and take decisions based on patterns, machine-learning algorithms, hard-coded rules, and/or the like, that specify how to handle specific situations such as, for example, how to handle the network traffic associated with a specific web service or application in the event of a failure. The information could include, for example, parameters of the underlying infrastructure or cloud computing environment, status events from the involved services, failure detection within the infrastructure, errors arising within a running application, etc.

Additionally, it will be appreciated that it would be desirable to provide an enhanced solution that can decide on how and when to trigger certain failover mechanisms, e.g., based on the computational results described above. The technical solution could in some instances consider a second stage detection mechanism that makes it possible to verify whether the provided information is correct, if something else has led to the failover situation, etc. In this regard, a so-configured failover service therefore may include a component that checks on a lower level whether a failover is needed (e.g., whether connection to the underlying database really has been lost) and, if so, determines how failover can be achieved.

Switching to a potential backup service usually involves computational overhead and otherwise resource intensive tasks. It therefore would be desirable to configure a failover service with an intelligent component that can make decisions regarding whether and at what time a switch is needed, whether a simple wait and retry loop with a possible notification to the end users about the service unavailability could be an adequate solution, etc.

One aspect of certain example embodiments relates to addressing the above-described and/or other issues. For example, one aspect of certain example embodiments relates to failover systems suitable for use in cloud computing environments, e.g., where microservice, SOA, and/or other architectures are implemented.

Certain example embodiments provide a resilience multiplexer configured to collect information and act as a communication unit between all involved applications and services, including backend services of the environment to be supervised. The resilience multiplexer is certain example embodiments directly communicates with the failover service, which is responsible for initiation of failover procedures. In certain example embodiments, a component manages a wait and retry loop in case the decision was made to not trigger a failover, and keeps track and learns from the decisions made, e.g., for application to future events.

Certain example embodiments advantageously provide an approach that determines whether failovers really are needed as well as a generic failover approach that involves take a deeper look into the involved applications and services. Certain example embodiments thus provide technical improvements in terms of triggering fewer failovers, triggering failovers at more appropriate times, providing failovers specifically tailored for distributed computing environments including cloud-based applications and services, and provide for the ability to learn how to more gracefully handle issues that arise in the future.

In certain example embodiments, a distributed computing system (e.g., a cloud computing system) is provided. In the system, a plurality of computing nodes cooperate to execute a shared application and/or service accessible by client computing devices over a network. The system also includes a failover service. Processing resources, including at least one processor, are configured as a multiplexer for use with the distributed computing system. The multiplexer is configured to at least receive a signal indicative of a potential problem with a component of the distributed computing system and/or the network; responsive to receipt of the signal, identify, from a store including a plurality of rules, at least one rule to be executed to determine how to respond to the potential problem, the at least one rule being identified based on (a) attributes of the received signal including which component generated the signal and what information is included in and/or otherwise associated with it, and (b) other network-related data; execute the at least one identified rule to determine whether a failover is or might be needed; in response to a determination that a failover is needed, confirm that the failover is needed and, based on the confirming, selectively trigger the failover service to initiate a preprogrammed failover sequence; and in response to a determination that a failover might be needed, initiate operation of a resilience mode in which: information regarding the potential problem is communicated to one or more components of or connected to the distributed computing system, other than the component that generated the received signal, without immediately initiating a preprogrammed failover sequence; and the operation of the resilience mode is continued, without initiating a preprogrammed failover sequence, until one or more predefined conditions are met, at which point either (a) the operation of the resilience mode is cancelled and the failover service is triggered to initiate a preprogrammed failover sequence, or (b) the operation of the resilience mode is cancelled and the failover service is not triggered.

According to certain example embodiments, one or more machine-learned rules may be considered in determining whether a failover is or might be needed. Output from the one or more considered machine-learned rules may be weighted less than the at least one identified rule in determining whether a failover is or might be needed.

According to certain example embodiments, machine learned rules may be based on failover efficacy information, which may be provided over a feedback bus or the like by an authorized user and/or automatically and programmatically. The efficacy information may indicate whether a failover ultimately was needed in response to a given received signal, how one or more components performed during operation of the resilience mode, etc.

According to certain example embodiments, the information regarding the potential problem is communicated to the failover service and indicates that a failover might soon be needed, and/or the information regarding the potential problem is communicated to one or more client computing devices that is/are at least attempting to interact with the shared application and/or service.

According to certain example embodiments, the received signal may originate with a cloud controller provided to the distributed computing system that is configured to track distributed computing system service information, and the one or more predefined conditions may relate to whether the distributed computing system is operating in a maintenance mode and a retry counter, as determined in connection with the cloud controller; the received signal may originate with a registry service provided to the distributed computing system that is configured to track computing node status, and the one or more predefined conditions may relate to whether a computing node has been added, stopped, or removed, as determined in connection with the registry service; the received signal may originate with an error handler of the shared application and/or service, and the one or more predefined conditions may relate to whether there is a connection issue with respect to the shared application and/or service and/or a runtime error, as determined in connection with the error handler; and/or the received signal may originate with the failover service, and the one or more predefined conditions may relate to whether there is a connection issue, node failure, and/or node stoppage.

In addition to the features of the previous paragraphs, counterpart methods, non-transitory computer readable storage media tangibly storing instructions for performing such methods, executable computer programs, and the like, are contemplated herein, as well. Similarly, servers, client devices, and the like, usable in connection with the systems laid out in the previous paragraphs, also are contemplated herein.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments described herein relate to techniques for intelligent and resilient failover in cloud computing environments, e.g., where microservice and/or service-oriented architectures are implemented. Advantageously, certain example embodiments are able to distinguish between "real" failover situations that could lead to time-consuming or otherwise resource-intensive operations and resource costs, and temporary outages that do not require any failover (e.g., when one is facing a temporary network disconnection). Certain example embodiments implement a runtime error or maintenance mode for specific services in these and/or other distributed computing environments.

Certain example embodiments are able to keep track of the availability of services and applications based on several stages and indications that can be used to decide if a failover sequence should be triggered or whether it can be avoided. In addition, certain example embodiments include a feedback channel that can be used to establish a self-learning mechanism for the failover service via a combination of supervised and unsupervised machine learning approaches. Supervised machine learning in this context refers to an approach in which feedback is given by an administrator or other suitable user to indicate whether a given request for failover was or was not needed. Unsupervised machine learning in this context reefers to an approach in which the failover service is provided with information from an automated component (e.g., a cloud controller could send the information that a node is available again, but takes, for example, 6 minutes to come alive again, instead of the expected 5 minutes). Based on the latter, the next time the failover service may add some additional wait time to determine whether the node will become alive again. To achieve such a behavior, components that monitor and track the current state of the services or web applications, as well as the current network status and runtime errors, may be provided.

In certain example embodiments, a resilience multiplexer is a computer-controlled component (e.g., software residing on a hardware computing node and executed by at least one processor and a memory) that decides based on received signals and the current environment settings and/or network status how to handle a specific failure event. Signal senders provided to the resilience multiplexer can be the cloud controller, the cloud's registry service, the failover service, the error handler, etc. The resilience multiplexer dispatches the received signals further on and takes a look at specific settings, e.g., to determine whether a resilience mode should be initiated, whether a failover should be triggered, etc. For example, the resilience multiplexer may check whether an affected node is currently in a maintenance mode. If that is the case, the multiplexer may start a resilience mode that does not lead to a failover sequence and instead only informs the failover service that an associated service is currently unavailable due to maintenance mode operation, with the failover service potentially informing implicated applications, clients, and/or the like.

Another possible situation involves the resilience multiplexer receiving a signal for a specific node that is not currently in a maintenance mode. In that case the signal may be evaluated and other possible options may be checked. For instance, a determination may be made as to whether there is a retry counter defined for a specific service. In that case, the resilience multiplexer may also start the resilience mode and inform the failover service that the specific service is being tried again for a certain time, and the failover service can in turn inform potentially implicated applications, clients, and/or the like. More traditional failover events (e.g., corresponding to denial of service, network outages, runtime errors, etc.) arising from applications can be handled by the failover service, as well.

Certain example embodiments are able to address some or all of the following and/or other failover scenarios:

1. The cloud controller sends a signal to the resilience multiplexer about a service or web application that went down. In this scenario, after evaluating the situation, the resilience multiplexer may inform the wait and retry loop. Alternatively, or in addition (e.g., after that wait and retry loop is unsuccessful), the resilience multiplexer may send a command to the failover service to perform a second stage evaluation to confirm whether a failover is necessary and/or desirable. The failover service can then inform the resilience multiplexer of the result of its evaluation.
2. The cloud controller informs the registry service of an event (e.g., a node went into an undefined state, an application is de-configured, etc.), which also could send a signal to the resilience multiplexer. The same or similar decisions as those made in connection with the resilience multiplexer in (1) are possible here, as well.
3. The registry service sends signals to the resilience multiplexer about, e.g., regarding deregistered services, lost alive nodes, etc. These signals are dispatched and send to the failover service, which can decide if there are still enough nodes left, whether to trigger a failover, etc.
4. The error handler can inform the resilience multiplexer of issues that it detects while sending error details. This information also can be dispatched and/or evaluated.
5. The client can send information about a timeout or unreachable service to the cloud controller, which provides this information to the resilience multiplexer.

In these and/or other scenarios, the resilience multiplexer makes a decision, based on the available information, whether the failover service should to be contacted, or whether it is sufficient to implement a wait and retry loop component so that an action can be tried again after and/or within a defined timeframe. In certain example embodiments, the failover service itself acts as a second stage failover detection, implementing its own logic and decision engine. It may in some instances have more information about the current state of an application and environment and in certain example embodiments contains a rule-based or other mechanism that can help decide whether the triggering of a failover is needed and/or desirable. The resilience multiplexer and/or failover service also can learn over time based on, for example, whether previously performed failover sequences were correctly triggered, information received from the administrator or other authorized user via a feedback channel, whether a node comes up again shortly after the decision to trigger the failover sequence was made, etc.

The failover service of certain example embodiments includes several sub-components. These sub-components include the failover detection sub-component, replication mapper, and re-balancer. The detection sub-component decides if triggering a failover is needed, and the replication mapper contains information needed to actually perform this determination. Via the failover service and using the replication mapper, databases may be switched over to replication nodes, new nodes may be started and registered with the cloud controller (which in turn informs the registry service), etc. If a switch to a replication node is performed, the re-balancer sub-component sends a command so that rebalancing of the data (e.g., of a whole tenant, an application, etc.) can be performed. The layer or logic responsible for this in certain example embodiments also can inform the wait and retry loop (e.g., if there are ongoing operations, like rebalancing or longer running tasks, etc.), ensure that clients are informed about current timeouts (which could be related to high loads or prioritized tasks, etc.), and so on.

Example Implementation

Details concerning an example implementation are provided below. It will be appreciated that this example implementation is provided to help demonstrate concepts of certain example embodiments, and aspects thereof are non-limiting in nature unless specifically claimed. For example, descriptions concerning the example components and/or sub-components, signals that are exchanged between components and/or sub-components, failover scenarios, example rules, etc., are non-limiting in nature unless specifically claimed.

Certain example embodiments provide a central component that handles the multiplexing of the different events and communicates with the failover service, as well as with the application(s) and/or service(s) provisioned in the cloud. In this regard, the resilience multiplexer of certain example embodiments makes it possible to handle error messages from the application, signal events sent by the cloud controller or registry service, etc., and inform the application via a wait and retry loop while communicating bi-directionally with the failover service.

Figure 1:
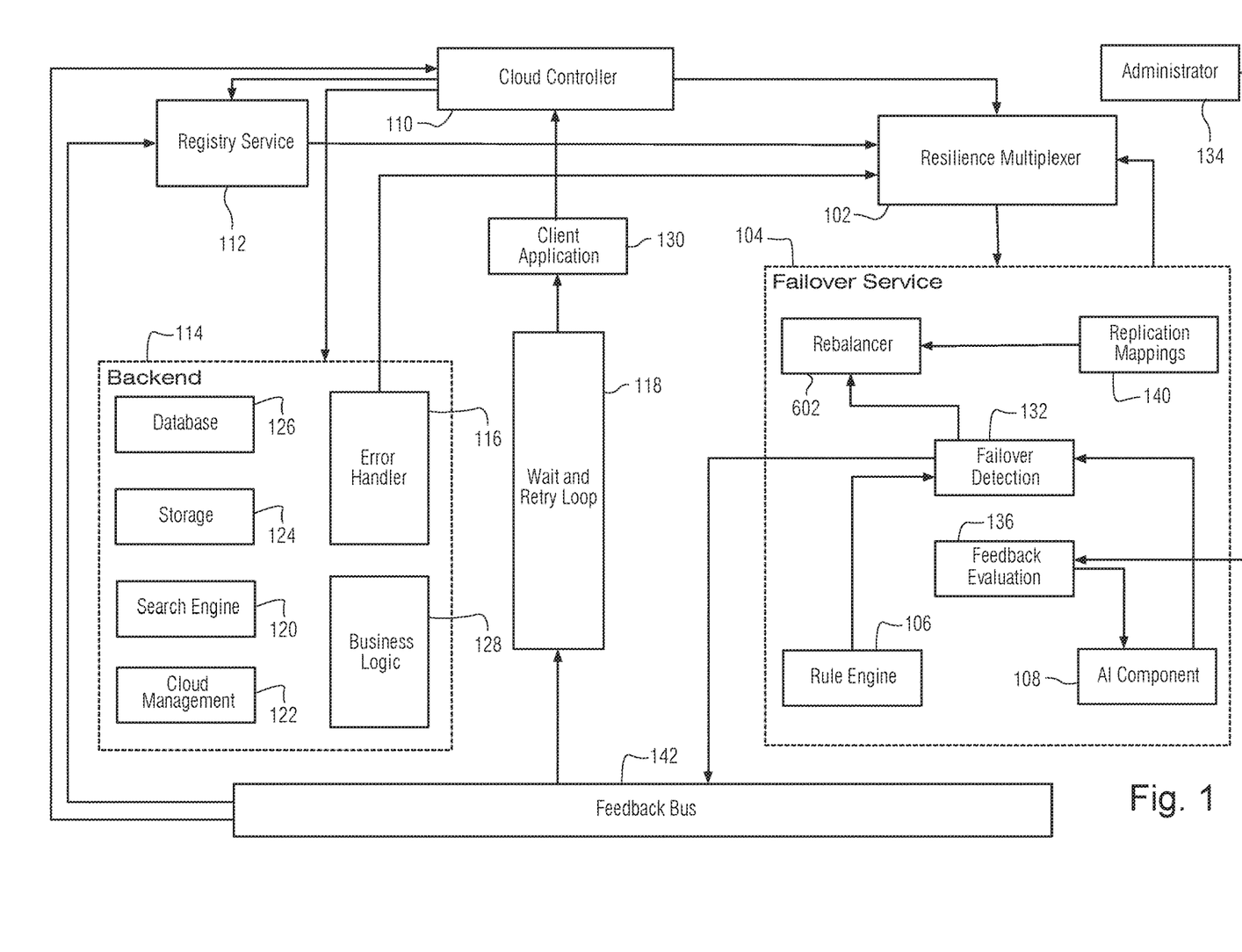
FIG. 1 is a block diagram of an example framework providing for intelligent and resilient failover in a cloud computing environment, in accordance with certain example embodiments.

FIG. 1 is a block diagram of an example framework providing for intelligent and resilient failover in a cloud computing environment, in accordance with certain example embodiments. In addition to the resilience multiplexer 102 and the failover service 104 (which includes, among other things, a rule engine 106 and an AI component 108 as noted above), FIG. 1 includes a cloud controller 110, registry service 112, the application backend 114 (which includes, among other things, an integrated error handler 116), and a wait and retry loop 118.

The cloud controller 110 sends signals about the health status of an application supported by the backend 114. The cloud controller 110 in certain example embodiments may send signals such as, for example, "node down", "node in maintenance mode", etc. These signals are processed in the resilience multiplexer 102. In the FIG. 1 example, the application is a search engine 120 implemented in the cloud, e.g., as managed by the cloud management module 122. The cloud management module 122 may be responsible for coordinating cloud-related activities associated with the application which, in this instance, may involve assigning map-reduce tasks to support the search engine 120, trigger scaling related-options with respect to additional/fewer nodes (e.g., when additional or less processing power, storage, bandwidth, and/or the like, is/are needed), etc. The backend 114 includes processing resources including at least one hardware processor operatively coupled to memory and at least the storage 124. In a distributed environment like the cloud, the processing resources may be distributed to a plurality of different hardware computing nodes, servers, and/or the like. The database 126 may be an in-memory and/or disk-backed data store that the search engine 120 can search, e.g., based on business logic 128 and in response to client requests from a client application 130 (which may run on a computing device that includes its own processing resources, etc.).

The registry service 112 keeps track of the available applications and services within a given infrastructure and sends signals about newly configured and/or de-configured nodes of a specific application or service. The registry service 112 is informed by the cloud controller 110 if a new application and/or a new service is made available. The resilience multiplexer 102 processes signals from the cloud controller 110 and the registry service 112, as well as from the error handler 116 included in the application backend 114. For example, if a "node down" signal is sent from the cloud controller 110, the multiplexer 102 informs the failover service 104, which can trigger a failover operation for the given service or application, e.g., if the applicable conditions are met.

If the failover service 104 receives a command from the resilience multiplexer 102 to trigger a failover event, the failover service 104 checks several states for an application and decides whether a failover operation is needed. For example, the failover service 104 may receive a command "trigger failover for node x (cause: node down)". In such a case, the implicated node and/or service may be pinged, and its health status may be checked again, e.g., via the failover detection module 132. The timing of the ping may be delayed, e.g., if there is some wait timer configured in a general failover description or a failover description more particularly tailored for the node, cause, etc. In this regard, the failover service 104 may be provided with or have access to a timer. As alluded to above, it also may have a set of predefined failover descriptors stored to a storage medium thereof, and descriptors may be defined at different levels, e.g., to take into account different applications, services, nodes, cloud configurations, and/or the like, individually, in combination, in sub-combination, and in combinations of sub-combinations.

If there is nothing configured, the failover sequence for a given service or application may be triggered. If there is something like a wait timer configured, the client application 130 is informed about the current status of the backend 114 via a wait and retry loop 118. This wait and retry loop 118 is informed by the resilience multiplexer 102, which receives this information from the failover service 104, and knows that the requested failover sequence has not yet been triggered. The possible events that can trigger a failover sequence, avoid a failover mechanism, simply inform the user to wait until a maintenance window is close, etc., could be send by the cloud controller 110, the registry service 112, the error handler 116, as feedback from the failover service 104 itself.

Figure 2:
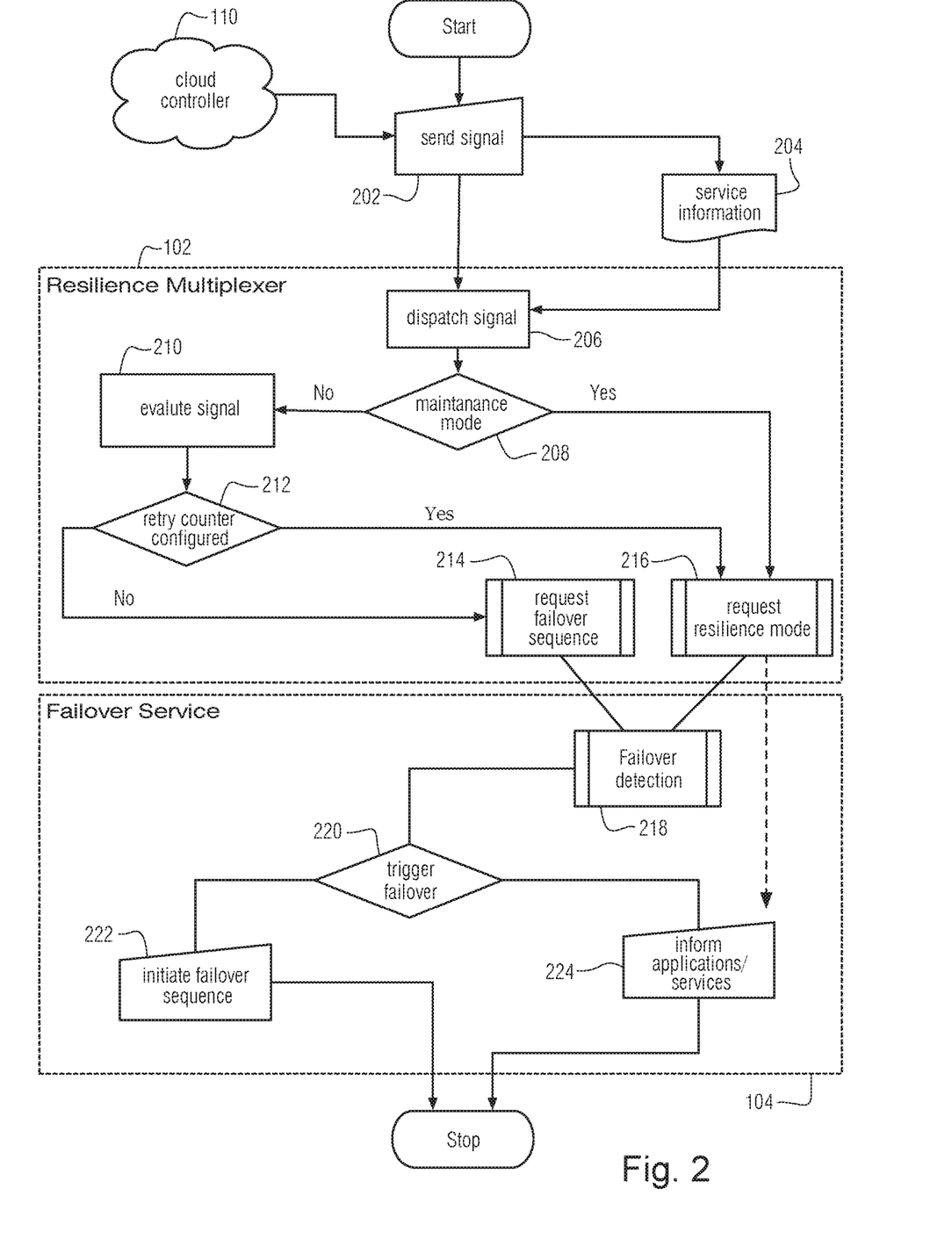
FIG. 2 is a flowchart showing a first example failover sequence, which is triggered by the cloud controller, in accordance with certain example embodiments.

Based on the above, it will be appreciated that there are at least four different common failover scenarios. FIG. 2 is a flowchart showing a first example failover sequence, which is triggered by the cloud controller, in accordance with certain example embodiments. In FIG. 2, the trigger signal is sent by the cloud controller 110. In this first example scenario, two main components, namely, the resilience multiplexer 102 and the failover service 104, are involved. The resilience multiplexer 102 evaluates the signal, whereas the failover service 104 decides whether a failover sequence should be triggered. Referring to FIG. 2 in more detail, the process starts in step 202 when the cloud controller 110 sends a signal. Service information 204 such as, for example, planned network outage information, a flag indicating whether maintenance mode has been started, etc., may be included in the signal from the cloud controller 110 and is transmitted to the resilience multiplexer 102 to a dispatcher sub-component that dispatches the signal in step 206. When the signal reaches the multiplexer 102, a determination is made in step 208 as to whether the maintenance mode is activated. If this is not the case (and, for example, the environment or a specific service is not in a maintenance mode), the signal is evaluated in step 210 to determine what to do next. In the case of a "node down" event, for example, the resilience multiplexer 102 may attempt to reach the implicated node and/or service again, e.g., to determine whether it was only temporarily unavailable. Attempts to reach the implicated node and/or service may be repeated, e.g., in the event that there is a retry counter configured. The retry counter may be set on a per-node and/or per-service basis in certain example embodiments. It may operate in connection with a wait timer in some instances, such that successive attempts to contact an implicated node and/or service are temporally spaced apart. If the node is unreachable and there is no retry counter or wait timer configured (determined in step 212), the failover sequence 214 is requested, and relevant information is relayed to the failover service 104. If there is a retry counter or wait timer configured (determined in step 212), resilience mode is started in step 216.

Figure 3:
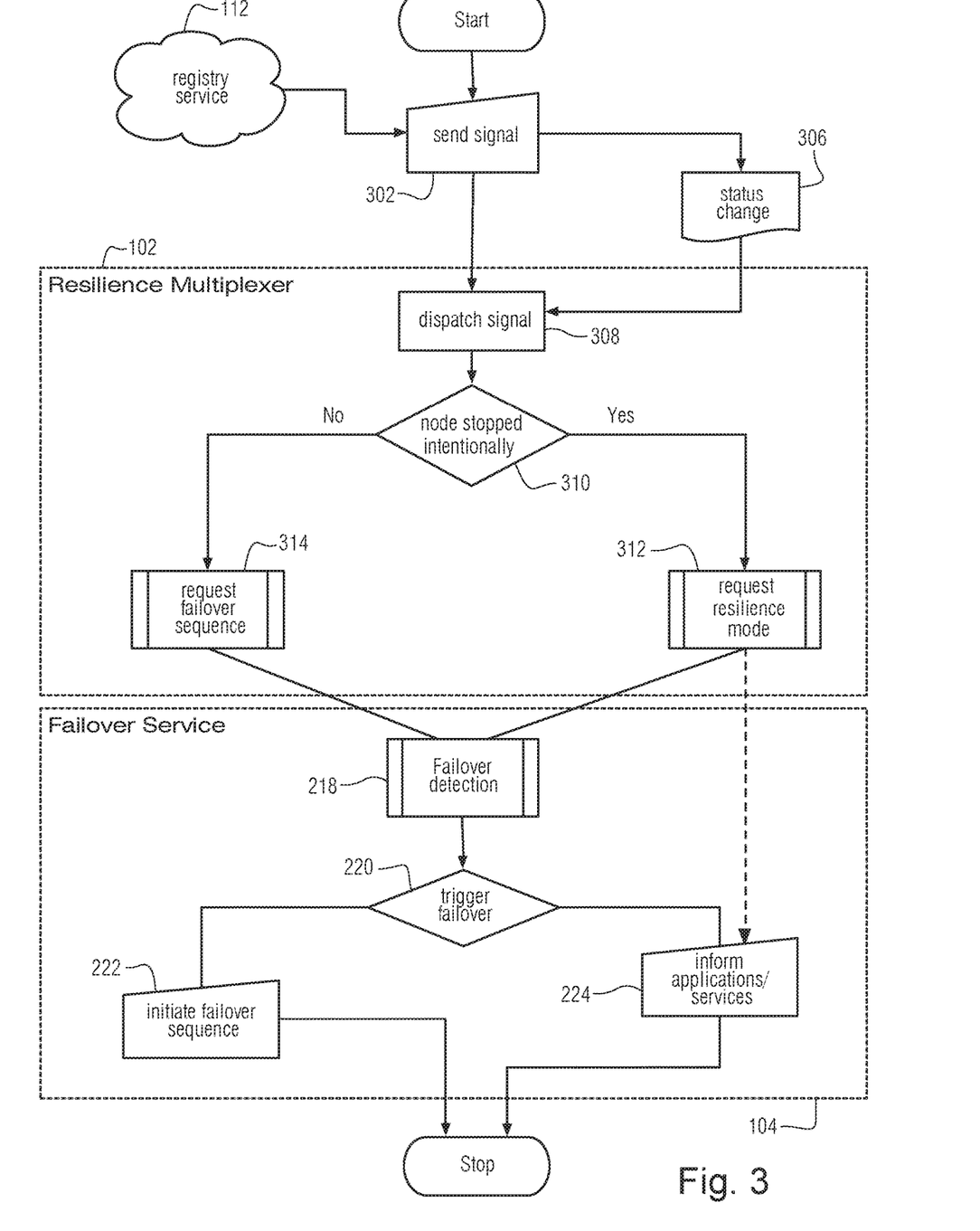
FIG. 3 is a flowchart showing a second example failover sequence, which is triggered by the registry service, in accordance with certain example embodiments.

FIG. 3 is a flowchart showing a second example failover sequence, which is triggered by the registry service, in accordance with certain example embodiments. In this case, the trigger signal 302 includes information about a status change 304 of one or more individual components, e.g., a node stopping, a node being removed, etc. Similar to the first example failover sequence, the signal 302 is routed through the resilience multiplexer 102. The signal is dispatched in step 308, similar to as noted above. When the signal reaches the multiplexer 102, the signal in step 310 is evaluated in order to determine whether a node has been stopped intentionally or has failed unexpectedly. If the node was stopped intentionally, the resilience mode is requested in step 312, as an unexpected failure has not in fact happened. On the other hand, if the node was not stopped intentionally, then the failover sequence is requested in step 314.

Figure 4:
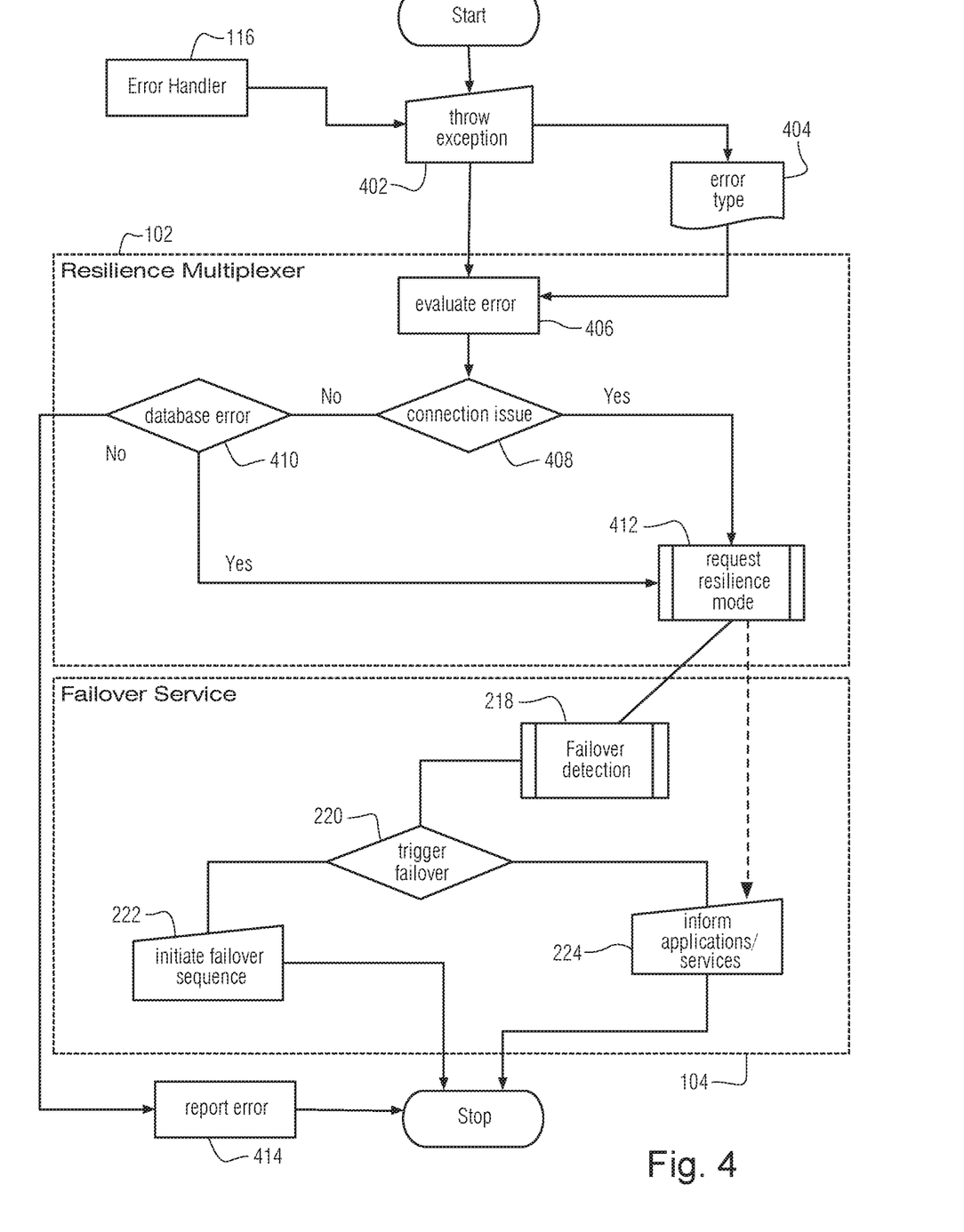
FIG. 4 is a flowchart showing a third example failover sequence, which is triggered by the error handler, in accordance with certain example embodiments.

FIG. 4 is a flowchart showing a third example failover sequence, which is triggered by the error handler, in accordance with certain example embodiments. In this case, the error handler 116 sends a signal 402 in the event of an infrastructure error (e.g., a potentially fatal infrastructure error such as, for example, the database being unreachable, unavailability of a critical infrastructure component, etc.). The signal 402 may be in the form of a thrown exception, for example, and includes information about the occurring error (e.g., error code and type). The flow then continues through the resilience multiplexer 102, where this information is evaluated in step 406. The multiplexer 102 in step 406 distinguishes between connection issues and other backend related issues such as, for example, database errors (such as the database being unavailable) in step 410, etc., and requests the resilience mode in step 412, accordingly.

Figure 5:
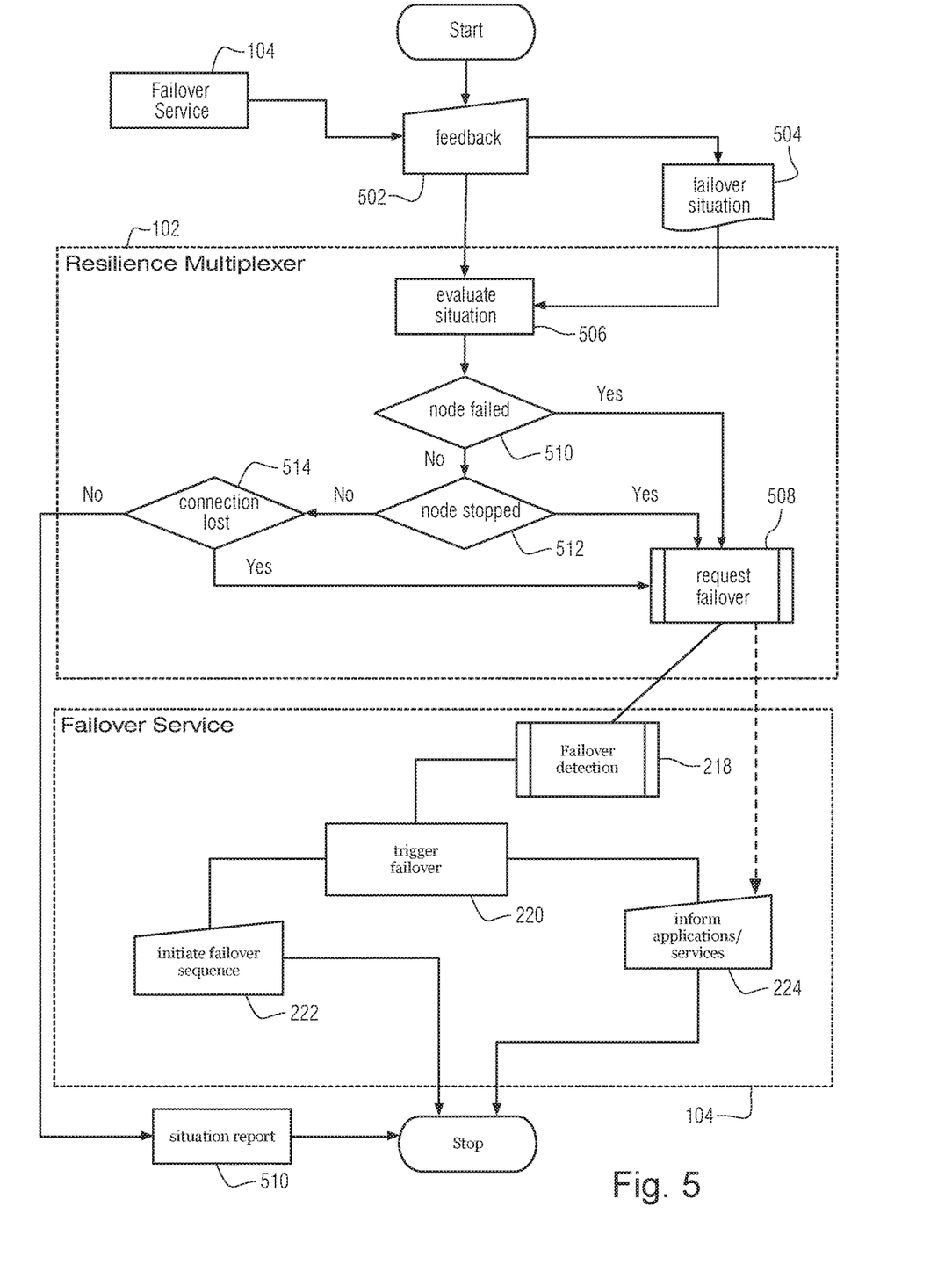
FIG. 5 is a flowchart showing a fourth example failover sequence, which is triggered by an internal signal of the failover service, in accordance with certain example embodiments.

FIG. 5 is a flowchart showing a fourth example failover sequence, which is triggered by an internal signal of the failover service 104, in accordance with certain example embodiments. In this case, and unlike the other cases discussed above in connection with FIGS. 2-4, the resilience mode is already started and the signal 502 originates from the failover service 104 itself. This scenario can be used to reevaluate the situation periodically without an external event serving as a stimulus. This may, for example, be desirable when a resilience mode has already been started previously and there is a desire to determine whether the issue has been resolved or has persisted. The signal 502 thus may be in the form of feedback from the failover service 104 and may include information about the failover situation 504. The resilience multiplexer 102 reevaluates the situation in step 506 by, for example, monitoring the complete system after a predefined time, at predefined intervals, etc. If the failover situation is still valid (e.g., because the failed node that caused the problem is still unavailable, a database connection is still unavailable, etc.), the failover is requested. The determination concerning the validity of the situation thus may include checks as to whether the node has failed (as in step 510), whether the node has stopped (as in step 512), whether the connection has been lost (as in step 514), etc. It will be appreciated that some or all of these checks may be performed in this or any other order, and that other checks may be performed in addition to those shown in FIG. 5.

Figure 6:
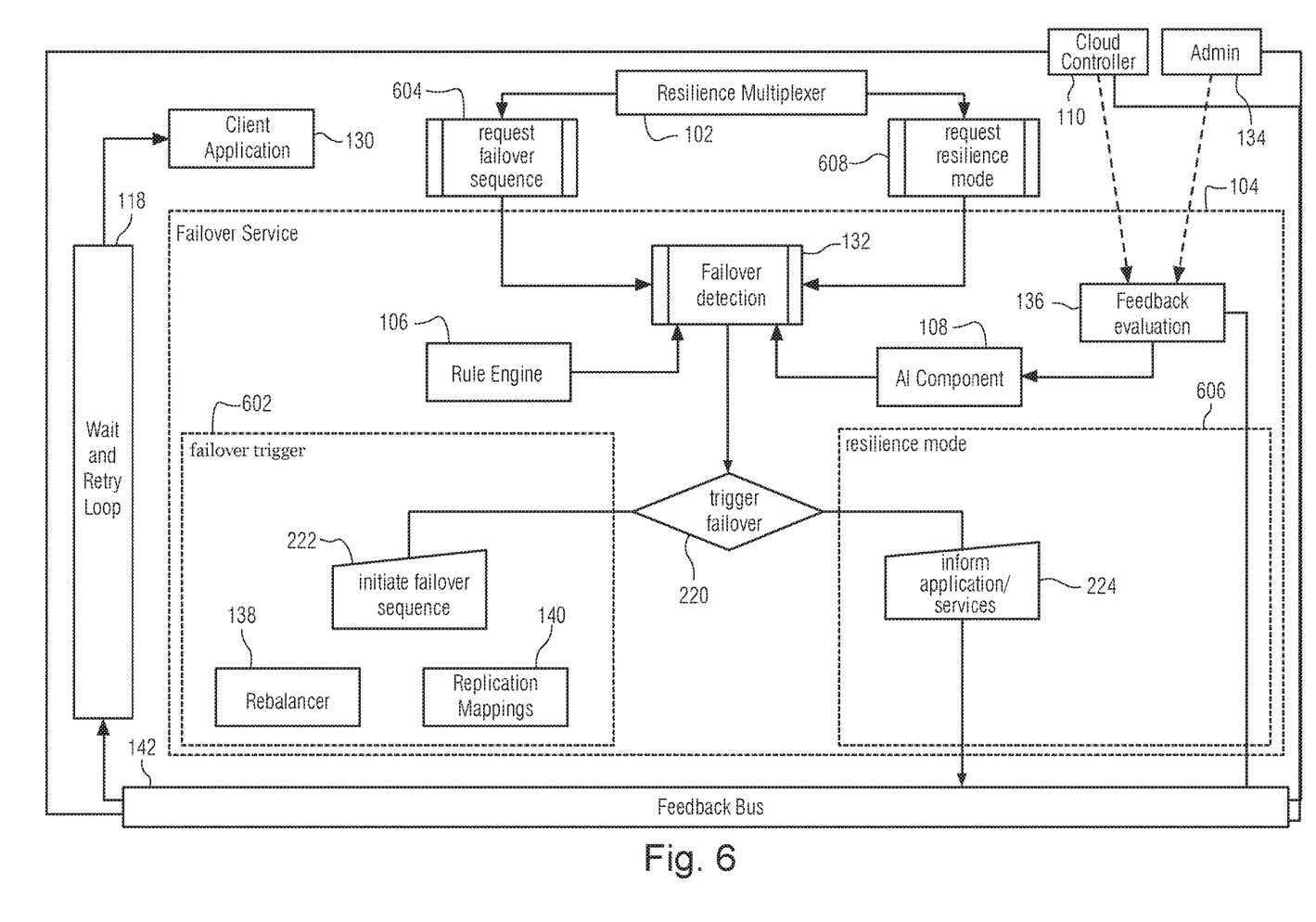
FIG. 6 is a block diagram showing details of the failover service of FIG. 1, as well as its interactions with other components, in accordance with certain example embodiments.

FIG. 6 is a block diagram showing details of the failover service of FIG. 1, as well as its interactions with other components, in accordance with certain example embodiments. As described above, the failover service 104 decides when a failover sequence is to be triggered and when resilience mode is to be activated, e.g., to avoid the overhead of automatically triggering failover any time a problem is discovered. It also is able to inform users of pertinent information such as, for example, information about waiting a specified time until the service is expected to again respond, information about an ongoing maintenance mode, etc. The failover service 104 receives information from the resilience multiplexer 102, which has already make a decision upfront based on the raw signals sent from multiple sources such as, for example, the cloud controller 110, the registry service 112, etc.

It can be seen from the left side of FIG. 6 that the failover trigger 602 is requested 604 from the resilience multiplexer. The failover detection component 132 itself receives its information from the rule engine 106 and the AI component 108. The rule engine 132 checks the signal it receives (in this case, the "trigger failover" signal) and sends decisions based on hardcoded and/or learned rules to the failover detection component 132. Rules could include, for example, "if failover is requested, and node 1 from service x is down for 2 minutes, then trigger a failover sequence".

The failover detection component 132 evaluates the input from the AI component 108, as well. The information from the AI component 108 could be learned information along the lines of, for example, "do not trigger failover, start resilience mode", because this component 108 learned from the past that the service in the hypothetical example discussed above was unreachable for 3 minutes in the past and responding again after 4 minutes. In a similar fashion, the AI component 108 could provide a veto on starting a failover mode, e.g., if an administrator 134 sends a complaint after the latest failover triggering based on the same "rule path" that the failover sequence was not needed. From evaluating information provided on the feedback channel 142, the AI component 108 can learn that even if the rules say that a failover sequence should be triggered the last 2 times, a human player disagreed on the exact same decision afterwards. Another possible veto could be that the AI component 108 learned that the last three times the failover was trigged, the cloud controller 110 sent feedback afterwards that the nodes were up and running again.

In general, information can be provided to the feedback bus as events that can be subscribed to via the publish/subscribe model or a variant thereof. The feedback can come in the form of error reports as shown in step 414 in FIG. 4, situation reports as shown in step 510 in FIG. 5, etc. As indicated above, the administrator 134 can provide information to the AI component 108 in a supervised machine learning context as a form of feedback, as well. Feedback information can be published as a topic or queue in certain example embodiments, e.g., based on the component providing the feedback, the node/service involved in the issue, etc.

If a determination is made to trigger the failover (e.g., in step 220 based on the failover detection in step 218 in FIGS. 2-5), the failover sequence 222 is started and the replication mappings 140 gives the blueprint for setting up new nodes, e.g., in terms of which tenants should be rebalanced on which new nodes via the re-balancer 138 so that all components for the tenants affected by the outage of the affected nodes can be accounted for. The re-balancer 138 thus distributes the tenants to new nodes so that the workload on all nodes can be balanced once again. The applications can be informed of the changes, e.g., as shown in step 224.

As can be appreciated from the right side of FIG. 6, the resilience multiplexer 102 can start the resilience mode 606 by issuing a request in step 608, e.g., because of known downtime such as, for example, a maintenance mode registered explicitly by an administrator 134 or implicitly by for example a system update that is scheduled and/or taking place. As depicted in FIG. 6, the rule engine 106 and the AI component 108 send their decisions to the failover detection unit component 132, which decides whether starting the resilience mode is appropriate in this instance. If the failover detection unit 132 decides to start the resilience mode, this information is send to the feedback bus 142, which informs the cloud controller 110, as well as the wait and retry loop 118, informing the client applications 130 and users that they can use the system again in a defined timeframe. If this timeframe cannot be held, the feedback channel 142 can send that updated information to the AI component 108, which can learn from the decision and/or outcome.

The ratio on which the information of the rule engine 106 and the AI component 108 are taken into consideration could be defined, e.g., such that hardcoded rules and learned rules receive different weights. An initial weighting ratio or threshold may be administrator or other authorized user defined (e.g., beginning at a weighting of 70% for hardcoded rules and 30% for AI-learned rules). The ratio can be altered with the runtime of the system, e.g., after the AI component 108 has significantly improved its experience of how the system and the outages work together, as the administrator 134 or other authorized user becomes satisfied with the learned rules, etc. In addition, the administrator 134 or other authorized user can designate learned rules from the AI component 108 as new hard-and-fast rules, thereby effectively updating the rules in the rule engine 106.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a distributed computing system including a plurality of computing nodes cooperating to execute a shared application and/or service accessible by client computing devices over a network, the method comprising:
receiving a signal indicative of a potential problem with a component of the distributed computing system and/or the network;
responsive to receipt of the signal, identifying, from a store including a plurality of rules, at least one rule to be executed to determine how to respond to the potential problem, the at least one rule being identified based on (a) attributes of the received signal including which component generated the signal and what information is included in and/or otherwise associated with it, and (b) other network-related data;
executing the at least one identified rule to determine whether a failover is or might be needed;
in response to a determination that a failover is needed, confirming that the failover is needed and, based on the confirming, selectively triggering a failover service to initiate a preprogrammed failover sequence; and
in response to a determination that a failover might be needed, initiating operation of a resilience mode in which:
information regarding the potential problem is communicated to one or more components of or connected to the distributed computing system, other than the component that generated the received signal, without immediately initiating a preprogrammed failover sequence; and
the operation of the resilience mode is continued, without initiating a preprogrammed failover sequence, until one or more predefined conditions are met, at which point either (a) the operation of the resilience mode is cancelled and the failover service is triggered to initiate a preprogrammed failover sequence, or (b) the operation of the resilience mode is cancelled and the failover service is not triggered.

2. The method of claim 1, further comprising considering one or more machine-learned rules in determining whether a failover is or might be needed.

3. The method of claim 2, wherein machine learned rules are based on failover efficacy information.

4. The method of claim 3, wherein the failover efficacy information is provided by an authorized user and indicates whether a failover ultimately was needed in response to a given received signal.

5. The method of claim 3, wherein the failover efficacy information is provided automatically and programmatically.

6. The method of claim 3, wherein the failover efficacy information indicates how one or more components performed during operation of the resilience mode.

7. The method of claim 2, further comprising weighting output from the one or more considered machine-learned rules less than the at least one identified rule, in determining whether a failover is or might be needed.

8. The method of claim 1, wherein the confirming that the failover is needed is based on additional data not used in initially determining whether a failover is or might be needed.

9. The method of claim 1, wherein the information regarding the potential problem is communicated to the failover service and indicates that a failover might soon be needed.

10. The method of claim 1, wherein the information regarding the potential problem is communicated to one or more client computing devices that is/are at least attempting to interact with the shared application and/or service.

11. The method of claim 1, wherein the received signal originates with a cloud controller provided to the distributed computing system, the cloud controller being configured to track distributed computing system service information.

12. The method of claim 11, wherein the one or more predefined conditions relate to whether the distributed computing system is operating in a maintenance mode and a retry counter, as determined in connection with the cloud controller.

13. The method of claim 1, wherein the received signal originates with a registry service provided to the distributed computing system, the registry service being configured to track computing node status.

14. The method of claim 13, wherein the one or more predefined conditions relate to whether a computing node has been added, stopped, or removed, as determined in connection with the registry service.

15. The method of claim 1, wherein the received signal originates with an error handler of the shared application and/or service.

16. The method of claim 15, wherein the one or more predefined conditions relate to whether there is a connection issue with respect to the shared application and/or service and/or a runtime error, as determined in connection with the error handler.

17. The method of claim 1, wherein the received signal originates with the failover service.

18. The method of claim 17, wherein the one or more predefined conditions relate to whether there is a connection issue, node failure, and/or node stoppage.

19. A non-transitory computer readable storage medium tangibly storing instructions that, when executed by at least one processor associated with a distributed computing system including a plurality of computing nodes cooperating to execute a shared application and/or service accessible by client computing devices over a network, perform functionality comprising:
receiving a signal indicative of a potential problem with a component of the distributed computing system and/or the network;
responsive to receipt of the signal, identifying, from a store including a plurality of rules, at least one rule to be executed to determine how to respond to the potential problem, the at least one rule being identified based on (a) attributes of the received signal including which component generated the signal and what information is included in and/or otherwise associated with it, and (b) other network-related data;
executing the at least one identified rule to determine whether a failover is or might be needed;
in response to a determination that a failover is needed, confirming that the failover is needed and, based on the confirming, selectively triggering a failover service to initiate a preprogrammed failover sequence; and
in response to a determination that a failover might be needed, initiating operation of a resilience mode in which:
information regarding the potential problem is communicated to one or more components of or connected to the distributed computing system, other than the component that generated the received signal, without immediately initiating a preprogrammed failover sequence; and
the operation of the resilience mode is continued, without initiating a preprogrammed failover sequence, until one or more predefined conditions are met, at which point either (a) the operation of the resilience mode is cancelled and the failover service is triggered to initiate a preprogrammed failover sequence, or (b) the operation of the resilience mode is cancelled and the failover service is not triggered.

20. A distributed computing system, comprising:
a plurality of computing nodes cooperating to execute a shared application and/or service accessible by client computing devices over a network;
a failover service; and
processing resources, including at least one processor, configured as a multiplexer for use with the distributed computing system, the multiplexer being configured to at least:
receive a signal indicative of a potential problem with a component of the distributed computing system and/or the network;
responsive to receipt of the signal, identify, from a store including a plurality of rules, at least one rule to be executed to determine how to respond to the potential problem, the at least one rule being identified based on (a) attributes of the received signal including which component generated the signal and what information is included in and/or otherwise associated with it, and (b) other network-related data;
execute the at least one identified rule to determine whether a failover is or might be needed;
in response to a determination that a failover is needed, confirm that the failover is needed and, based on the confirming, selectively trigger the failover service to initiate a preprogrammed failover sequence; and
in response to a determination that a failover might be needed, initiate operation of a resilience mode in which:
information regarding the potential problem is communicated to one or more components of or connected to the distributed computing system, other than the component that generated the received signal, without immediately initiating a preprogrammed failover sequence; and
the operation of the resilience mode is continued, without initiating a preprogrammed failover sequence, until one or more predefined conditions are met, at which point either (a) the operation of the resilience mode is cancelled and the failover service is triggered to initiate a preprogrammed failover sequence, or (b) the operation of the resilience mode is cancelled and the failover service is not triggered.

21. The system of claim 20, further comprising a feedback bus;
wherein one or more machine-learned rules is/are considered in determining whether a failover is or might be needed; and
wherein machine learned rules are based on failover efficacy information provided over the feedback bus.

22. The system of claim 21, wherein at least some of the failover efficacy information is provided automatically and programmatically based on operation of the resilience mode.

23. The system of claim 20, further comprising:
a cloud controller configured to track distributed computing system service information;
a registry service configured to track computing node status; and
an error handler of the shared application and/or service;
wherein each of the cloud controller, registry service, error handler, and failover service is configured to generate a signal indicative of a potential problem with a component of the distributed computing system and/or the network.

24. The system of claim 23, wherein substantive content of signals generated by the cloud controller, registry service, error handler, and failover service varies.

25. A hardware computing node configured to execute a resilience multiplexer for use with the distributed computing system of claim 20.

* * * * *